(12) United States Patent
Gerstel et al.

(10) Patent No.: US 7,634,196 B2
(45) Date of Patent: Dec. 15, 2009

(54) OPTICAL ADD/DROP MULTIPLEXER WITH RECONFIGURABLE ADD WAVELENGTH SELECTIVE SWITCH

(75) Inventors: Ornan Gerstel, Los Altos, CA (US); Stefano Piciaccia, Milan (IT); Mauro Macchi, Varese (IT); Mauro Rudi Casanova, Milan (IT); Ronald Johnson, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 784 days.

(21) Appl. No.: 10/959,366

(22) Filed: Oct. 6, 2004

(65) Prior Publication Data

US 2006/0072918 A1    Apr. 6, 2006

(51) Int. Cl.
*H04J 14/02*    (2006.01)
(52) U.S. Cl. .................... 398/83; 398/7; 398/79
(58) Field of Classification Search .......... 398/7, 398/79, 83
See application file for complete search history.

(56) References Cited

U.S. PATENT DOCUMENTS

| | | | | |
|---|---|---|---|---|
| 5,392,154 A * | 2/1995 | Chang et al. | ............ | 359/341.3 |
| 5,748,349 A * | 5/1998 | Mizrahi | .................. | 398/84 |
| 5,953,141 A * | 9/1999 | Liu et al. | ................... | 398/83 |
| 5,974,207 A * | 10/1999 | Aksyuk et al. | .............. | 385/24 |
| 6,038,045 A * | 3/2000 | Sotom et al. | ................... | 398/1 |
| 6,148,124 A * | 11/2000 | Aksyuk et al. | .............. | 385/24 |
| 6,167,171 A * | 12/2000 | Grasis et al. | ................. | 385/24 |
| 6,208,443 B1 * | 3/2001 | Liu et al. | ...................... | 398/9 |
| 6,426,815 B1 * | 7/2002 | Koehler | ..................... | 398/59 |
| 6,498,665 B1 * | 12/2002 | Chauzat et al. | ............ | 398/83 |
| 6,538,783 B1 * | 3/2003 | Stephens | .................. | 398/82 |
| 6,594,046 B1 * | 7/2003 | Nishino | ..................... | 359/239 |
| 6,721,473 B1 * | 4/2004 | Islam et al. | .................. | 385/18 |
| 6,721,475 B1 * | 4/2004 | Islam et al. | .................. | 385/24 |
| 6,751,372 B2 * | 6/2004 | Feuer et al. | .................. | 385/24 |
| 6,795,605 B1 * | 9/2004 | Islam et al. | .................. | 385/22 |
| 6,801,679 B2 * | 10/2004 | Koh et al. | .................... | 385/14 |
| 6,847,479 B1 * | 1/2005 | Islam et al. | ................ | 359/359 |
| 6,856,719 B2 * | 2/2005 | Wang et al. | ................... | 385/17 |
| 6,868,201 B1 * | 3/2005 | Johnson et al. | ............. | 385/24 |
| 6,885,820 B2 * | 4/2005 | Eder et al. | .................... | 398/26 |
| 6,968,102 B2 * | 11/2005 | Tochio et al. | ............... | 385/24 |
| 7,133,609 B2 * | 11/2006 | Kim et al. | ..................... | 398/3 |
| 7,236,704 B1 * | 6/2007 | Cao | ............................ | 398/83 |
| 7,254,327 B1 * | 8/2007 | Zhong et al. | ................. | 398/33 |
| 7,254,336 B2 * | 8/2007 | Harney et al. | ............... | 398/83 |
| 7,277,608 B2 * | 10/2007 | Isomura et al. | .............. | 385/24 |

(Continued)

*Primary Examiner*—Ken N Vanderpuye
*Assistant Examiner*—Danny W. Leung (57) ABSTRACT

A reconfigurable WDM add/drop multiplexer and its method of operation at an add/drop node on an optical fiber carrying a plurality of WDM signals is described. The WDM add/drop multiplexer has a coupler and a demultiplexer element dropping WDM signals from the optical fiber to a plurality of drop terminals, and a wavelength-selective switch adding WDM signals from a plurality of add terminals onto the optical fiber. The coupler splits the WDM signals received from the optical fiber and passes the split WDM signals to the first and second output terminals. The demultiplexer element separates the split WDM signals at the plurality of drop terminals. The wavelength-selective switch, which has an input terminal for connection to the second coupler output terminal and an output terminal for connection to the optical fiber, selectively adds WDM signals on the plurality of add terminals to the optical fiber responsive to control signals.

28 Claims, 5 Drawing Sheets

U.S. PATENT DOCUMENTS

| | | | | |
|---|---|---|---|---|
| 7,292,786 B1* | 11/2007 | Barbarossa et al. | ............ | 398/83 |
| 7,308,197 B1* | 12/2007 | Zhong et al. | .................. | 398/48 |
| 7,321,729 B2* | 1/2008 | Gumaste et al. | ............... | 398/59 |
| 7,330,650 B2* | 2/2008 | Kim et al. | ....................... | 398/4 |
| 7,343,096 B1* | 3/2008 | Bhatnagar | .................... | 398/83 |
| 7,356,217 B2* | 4/2008 | Eberlein et al. | ............... | 385/24 |
| 7,460,744 B2* | 12/2008 | Nakagawa | ..................... | 385/24 |
| 2001/0009465 A1* | 7/2001 | Uehara | ....................... | 359/124 |
| 2001/0015837 A1* | 8/2001 | Hung | .......................... | 359/124 |
| 2002/0012143 A1* | 1/2002 | Graves et al. | ................ | 359/128 |
| 2002/0093707 A1* | 7/2002 | Katagiri et al. | .............. | 359/124 |
| 2002/0131118 A1* | 9/2002 | Chiaroni et al. | ............. | 359/127 |
| 2002/0176134 A1* | 11/2002 | Vohra | .......................... | 359/127 |
| 2002/0186431 A1* | 12/2002 | Bisson | ......................... | 359/124 |
| 2003/0025956 A1* | 2/2003 | Li et al. | ....................... | 359/110 |
| 2003/0081283 A1* | 5/2003 | Ishizuka et al. | ............. | 359/124 |
| 2003/0108290 A1* | 6/2003 | Zhang et al. | ................. | 385/37 |
| 2003/0123881 A1* | 7/2003 | Milton et al. | ................. | 398/83 |
| 2003/0161635 A1* | 8/2003 | Milton et al. | ................. | 398/79 |
| 2003/0175029 A1* | 9/2003 | Harney et al. | ................. | 398/83 |
| 2003/0175030 A1* | 9/2003 | Chen et al. | .................... | 398/85 |
| 2003/0185567 A1* | 10/2003 | Kurumida et al. | ............. | 398/79 |
| 2004/0161237 A1* | 8/2004 | Stephens | ....................... | 398/82 |
| 2004/0218526 A1* | 11/2004 | Kim et al. | .................... | 370/228 |
| 2005/0068631 A1* | 3/2005 | Liu et al. | ..................... | 359/618 |
| 2005/0117909 A1* | 6/2005 | Aoki et al. | .................... | 398/85 |
| 2005/0226620 A1* | 10/2005 | Feuer et al. | .................... | 398/83 |
| 2005/0226621 A1* | 10/2005 | Kikuchi et al. | ................. | 398/83 |
| 2005/0286896 A1* | 12/2005 | Kinoshita et al. | ............... | 398/83 |
| 2006/0034610 A1* | 2/2006 | Akiyama et al. | .............. | 398/83 |
| 2006/0051094 A1* | 3/2006 | Moriwaki et al. | ............. | 398/84 |
| 2006/0072918 A1* | 4/2006 | Gerstel et al. | ................. | 398/83 |
| 2006/0104641 A1* | 5/2006 | Casanova et al. | ............. | 398/83 |
| 2006/0171717 A1* | 8/2006 | Kikuchi | ....................... | 398/83 |
| 2007/0014513 A1* | 1/2007 | Isomura et al. | ............... | 385/24 |
| 2007/0160372 A1* | 7/2007 | Eberlein et al. | ............... | 398/83 |
| 2007/0274715 A1* | 11/2007 | Pichler et al. | ................. | 398/48 |
| 2007/0297802 A1* | 12/2007 | Uchiyama et al. | ............. | 398/83 |
| 2008/0118245 A1* | 5/2008 | Chang et al. | .................. | 398/79 |
| 2008/0138068 A1* | 6/2008 | Akiyama et al. | .............. | 398/50 |

* cited by examiner

Prior Art

FIG. 1A

Prior Art

FIG. 1B

Prior Art

OPTICAL ADD/DROP MULTIPLEXER WITH RECONFIGURABLE ADD WAVELENGTH SELECTIVE SWITCH

BACKGROUND OF THE INVENTION

The present invention is related to WDM (Wavelength Division Multiplexing) optical systems and, more particularly, to systems and methods for adding and dropping WDM communication channels in WDM systems.

In WDM systems, multiple optical signals having different wavelengths share an optical fiber, each wavelength defining a particular communication channel. This technique has many advantages in implementing optical communication systems including increased capacity and the ability to use passive optical components to redirect a portion of the data flowing along the fiber for processing at an intermediate node.

A representative WDM system may include multiple nodes connected to one another by optical fiber. For example, the nodes may be connected in a ring. Each node typically uses only certain wavelengths (also referred to herein as WDM channels) for transmission and reception and leaves the other wavelengths untouched. A WDM add/drop multiplexer isolates and removes (or "drops") these channels from the light flow past the optical fiber node. The channels that are dropped in this way are processed by receiver circuitry within the node or otherwise rerouted. The node also generates signals on these channels for transmission onto the fiber. The add/drop multiplexer combines (or "adds") these new signals into the light flow past the node. Hence the add/drop multiplexer implements the drop and add functions of the node, which itself is often termed an add/drop node on the optical fiber.

But there are many challenges in implementing add-drop multiplexers, in particular, configurable add/drop multiplexers by which the WDM channels which are added or dropped, or both, may be dynamically changed. These challenges are exacerbated by the increasing use of DWDM (dense wave division multiplexing) where the WDM channels are very closely spaced in the frequency (or wavelength) domain. For example, the spacing between wavelength components may be 25 GHz or less making frequency-selective processing of the optical signal difficult with passive optical components of reasonable cost.

The present invention addresses at least some of these challenges with an reconfigurable add/drop multiplexer which has maximum optical performance with functional flexibility at relatively low cost.

SUMMARY OF THE INVENTION

The present invention provides for a reconfigurable WDM add/drop multiplexer operative as an add/drop node on an optical fiber carrying a plurality of WDM signals. A coupler and demultiplexer element drop WDM signals from the optical fiber to a plurality of drop terminals and a wavelength-selective switch adds WDM signals from a plurality of add terminals onto the optical fiber. The coupler has an input terminal for connection to the optical fiber and first and second output terminals with the demultiplexer element connected to the first output terminal. The coupler splits the WDM signals received from the optical fiber and passes the split WDM signals to the first and second output terminals. The demultiplexer element separates the split WDM signals at the plurality of drop terminals. The wavelength-selective switch, which has an input terminal for connection to the second coupler output terminal and an output terminal for connection to the optical fiber, selectively adds WDM signals on the plurality of add terminals to the optical fiber responsive to control signals.

The present invention also provides for a method of operating an add/drop node on an optical fiber carrying a plurality of WDM signals. The method has the steps of splitting the WDM signals on said optical fiber into first and second paths; separating the WDM signals on the first path at a plurality of drop terminals; separating the WDM signals on the second path into a plurality of wavelength paths; simultaneously selectively adding WDM signals on a plurality of add terminals into at least some of the wavelength paths and blocking the separated signals on at least some of the wavelength paths responsive to control signals; and combining the added WDM signals on at least some of the wavelength paths and non-blocked separated signals on a balance of the wavelength paths into the optical fiber so that whereby add/drop multiplexer operations are performed on the add/drop node.

Furthermore, the present invention provides for a reconfigurable WDM add/drop multiplexer operative as an add/drop node on an optical fiber carrying a plurality of WDM signals. The add/drop multiplexer comprises means for splitting the WDM signals on the optical fiber into first and second paths; means for separating the WDM signals on the first path at a plurality of drop terminals; means for separating the WDM signals on the second path into a plurality of wavelength paths; means for simultaneously selectively adding WDM signals on a plurality of add terminals into at least some of said wavelength paths and blocking the separated signals on at least some of the wavelength paths responsive to control signals; and means for combining the added WDM signals on at least some of the wavelength paths and nonblocked separated signals on a balance of the wavelength paths into the optical fiber.

DESCRIPTION OF SPECIFIC EMBODIMENTS

An appreciation of the present invention and the challenges facing reconfigurable add/drop multiplexers may be gained by a review of designs of current and past add/drop multiplexers. In passing, it should be noted that the term, "multiplexer," is used in optical communication systems to loosely cover devices and combination of devices at different levels of complexity and organization. For example, add/drop multiplexers which are the subject of the present invention often contain constituent elements which are also termed "multiplexers" (or demultiplexers). These multiplexer elements are often interferometric in fundamental nature, and internally may be Mach-Zehnder interferometers, Fabry-Perot interferometers, arrayed waveguide gratings, devices based on crystal-based Fourier filter technology, etc. For purposes of clear, exposition, such constituent elements are called multiplexer elements below.

Add/drop multiplexers have drop and add functions, and a third function, that of wavelength blocking. As stated previously, the drop function refers to the diversion of signals of one or more WDM channels at an optical fiber node and the add function refers to the insertion of WDM channel signals at the optical fiber node. Typically, the dropped and added WDM channels are the same and the blocking function keeps the signals of the dropped channels from interfering with the signals of the added channels in the optical fiber.

Figure 1A:
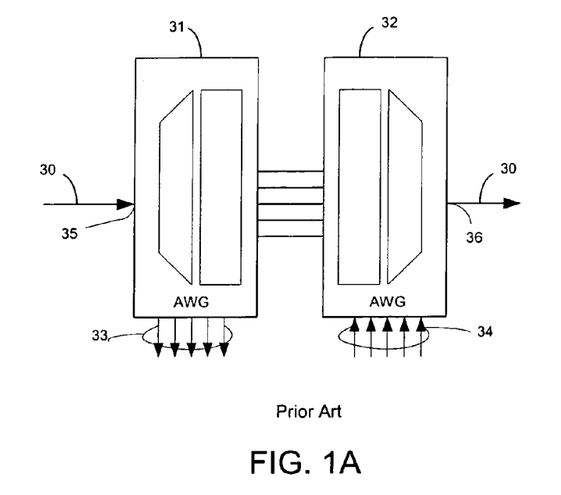
FIG. 1A illustrates an add/drop multiplexer architecture with AWGs for add and drop functions.

These functions are demonstrated in the add/drop multiplexer of FIG. 1A which uses AWGs (Arrayed Waveguide Gratings). A first AWG 31 operates as a demultiplexer element for the "drop" function and only one input terminal 35 of the nominal m×m AWG 31 is used to receive WDM signals on an optical fiber 30. Some of the m output terminals are used as drop terminals 33 and the remaining output terminals are connected to a corresponding number of input terminals of a second AWG 32. The remaining input terminals of the AWG 32 are used as add terminals 34 and only one output terminal of the nominal m×m organization of the AWG 32 is used as an output terminal 36, which is connected to the optical fiber 30.

This AWG-based add/drop multiplexer has certain advantages. Because the insertion loss of an AWG is about 6 dB, the add/drop multiplexer has a fairly low drop insertion loss, i.e., loss from the input terminal 35 to a drop terminal 33, of 6 dB. The add insertion loss, i.e., loss from an add terminal 34 to the output terminal 36, is also low, 6 dB, and the through insertion loss, i.e., loss between the input terminal 35 and output terminal 36, for the add/drop multiplexer, is about 12 dB. This architecture has the advantages of scalability in manufacturing since the AWGs are built on substrates (so-called "flat top" AWGs are suggested) using semiconductor technologies. This manufacturing technology also permits easy channel monitoring.

However, each wavelength is carried over a separate fiber between the demultiplexer element 31 and the multiplexer element 32, as well as between the multiplexer element 32 and the add ports 34, and between the demultiplexer element 31 and the drop ports 33. Dropping, adding or passing a wavelength through is made by disconnecting and reconnecting the optical fibers. This manual reconfiguration requires more work and is more error prone. For example, a technician disconnecting an exemplary wavelength 1 in order to drop it locally might accidentally disconnect another wavelength 2 which is carrying traffic.

Figure 1B:
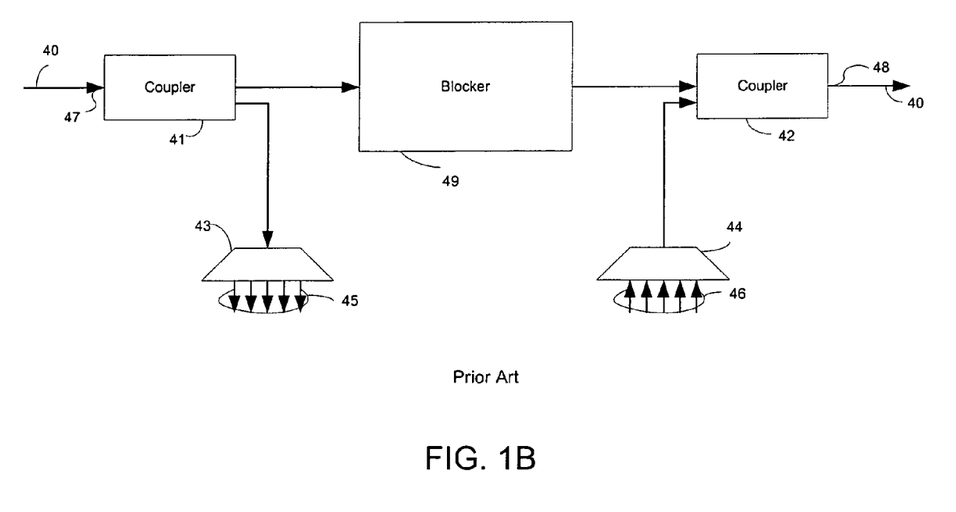
FIG. 1B illustrates an add/drop multiplexer architecture with a wavelength blocker.

Another WDM multiplexer architecture which straightforwardly addresses the blocking of dropped WDM signals is illustrated in FIG. 1B. Couplers 41 and 42 are inserted on an optical fiber 40 for the drop and add functions respectively. The first coupler 41 receives the incoming WDM signals on the optical fiber 40 at an input terminal 47 and splits the signals. Most of the WDM signal power is sent toward the second coupler 42 and a minority (say, 20%) of the WDM signal power is diverted to a Gaussian AWG 43 operating as a demultiplexer element. The AWG 43 splits the WDM signals further onto drop terminals 45. Again arrangements must be made at the drop terminals 45 to select the particular signals for the WDM drop channels. The second coupler 42 provides the add function and is connected to a second Gaussian AWG 44, operating as a multiplexer element, with add terminals 46 for the WDM signals to be added through the coupler 42. The coupler 42 merges these signals equally in power with signals from the first coupler 41 at the output terminal 48 connected to the optical fiber 40.

To ensure that the added WDM signals are not interfered with by signals from the first coupler 41, a wavelength blocker 49 is placed between the two couplers 41 and 42. In response to control signals, the reconfigurable wavelength blocker 49 blocks the signals of selected WDM channels from the first coupler 41. Signals in these selected WDM channels are added by the add terminals 46 through the second coupler 42.

Performance calculations show that this add/drop multiplexer has a drop insertion loss of 12 dB, an add insertion loss of 8 dB and a through insertion loss of 12 dB in which most of the loss, about 7 dB, is across the wavelength blocker 49. Preamplification of the WDM signals (not shown in the drawings) must be performed to compensate for the severe drop insertion loss. Metering of the power of the WDM signals is also required to equalize power between the WDM channels. Thus, although the FIG. 1B add/drop multiplexer results in a simpler arrangement than the double-AWG add/drop multiplexer of FIG. 1A, additional elements are required for the proper functioning of the FIG. 1B add/drop multiplexer.

Figure 1C:
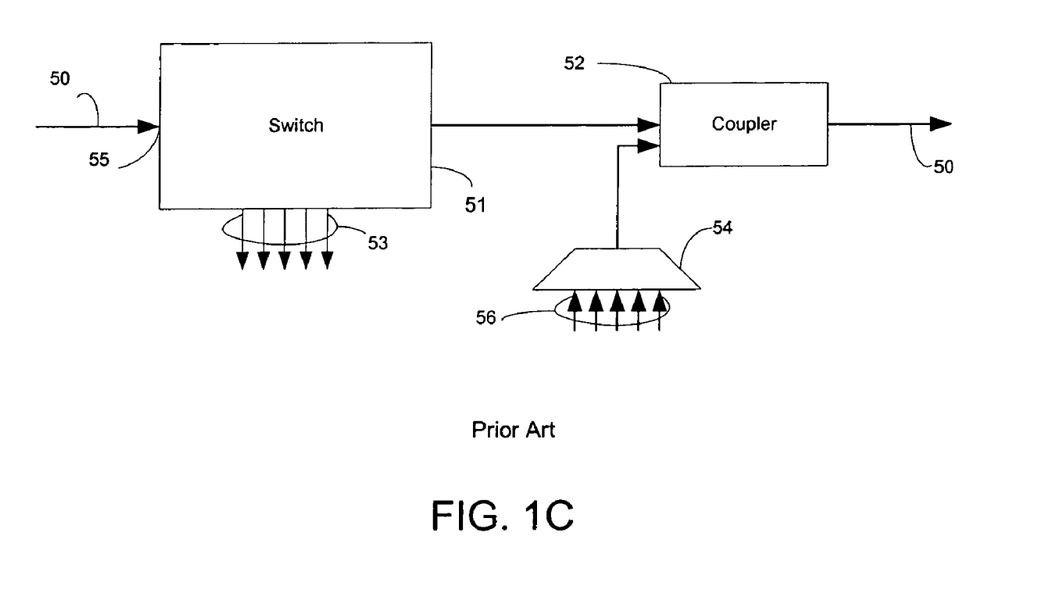
FIG. 1C illustrates an add/drop multiplexer architecture with a wavelength-selective switch for its drop function.

Optical designers have used wavelength-selective switches for the drop function in add/drop multiplexers in recognition that wavelength blocking is inherent in the resulting add/drop multiplexer. Such an architecture is shown in FIG. 1C in which a wavelength-selective switch 51 is connected by its input terminal 55 to an optical fiber 50. In response to control signals, the wavelength-selective switch 51 directs selected WDM signals from the optical fiber 50 to drop terminals 53 or to a coupler 52. The coupler 52, which has an output terminal 58 connected to the optical fiber 50, is also connected to an AWG 54, operating as a multiplexer, with add terminals 56. The coupler 52, typically having a 50/50 ratio, and the AWG 54 perform the add function of the FIG. 1C add/drop multiplexer.

Figure 1D:
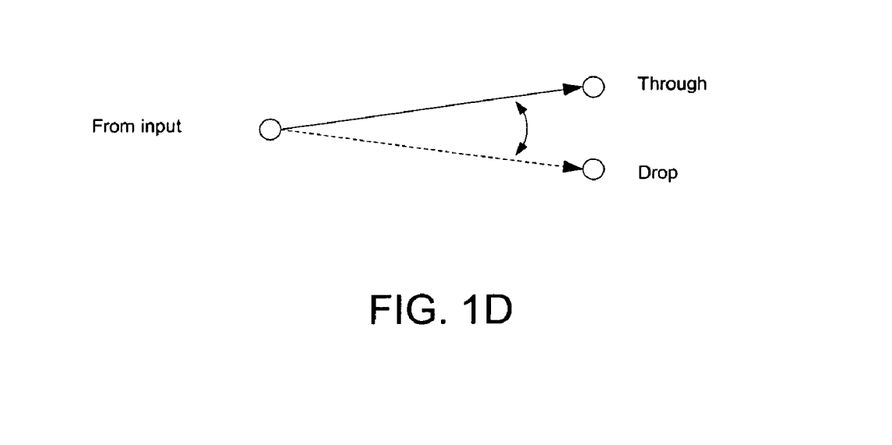
FIG. 1D shows a representation of a 1×2 switch to illustrate the blocking function in the wavelength-selective switch of FIG. 1C.

FIG. 1D is a representation of an exemplary 1×2 switch to illustrate the operation of the switch 51 on a WDM channel. Signals of a WDM channel arriving from the input terminal 55 of the switch 51 can be sent by the switch either through to the coupler 52 or to a drop terminal 53. If the WDM signals are sent to the drop terminal 53, those WDM signals cannot reach the add coupler and interfere with signals from an add terminal. The drop signals are effectively "blocked" by the nature of the switch.

From a performance standpoint, the FIG. 1C architecture has certain advantages. This add/drop multiplexer has an approximate drop insertion loss of 6 dB, an add insertion loss of 8 dB and a through insertion loss of 12.5 dB of which the wavelength-selective switch contributes about 9.5 dB. The low drop insertion loss reduces the likelihood of a preamplification requirement for the dropped signals, and the straightforward architecture is scalable in manufacturing and allows for easy monitoring of the various WDM signal paths in the add/drop multiplexer.

Figure 1E:
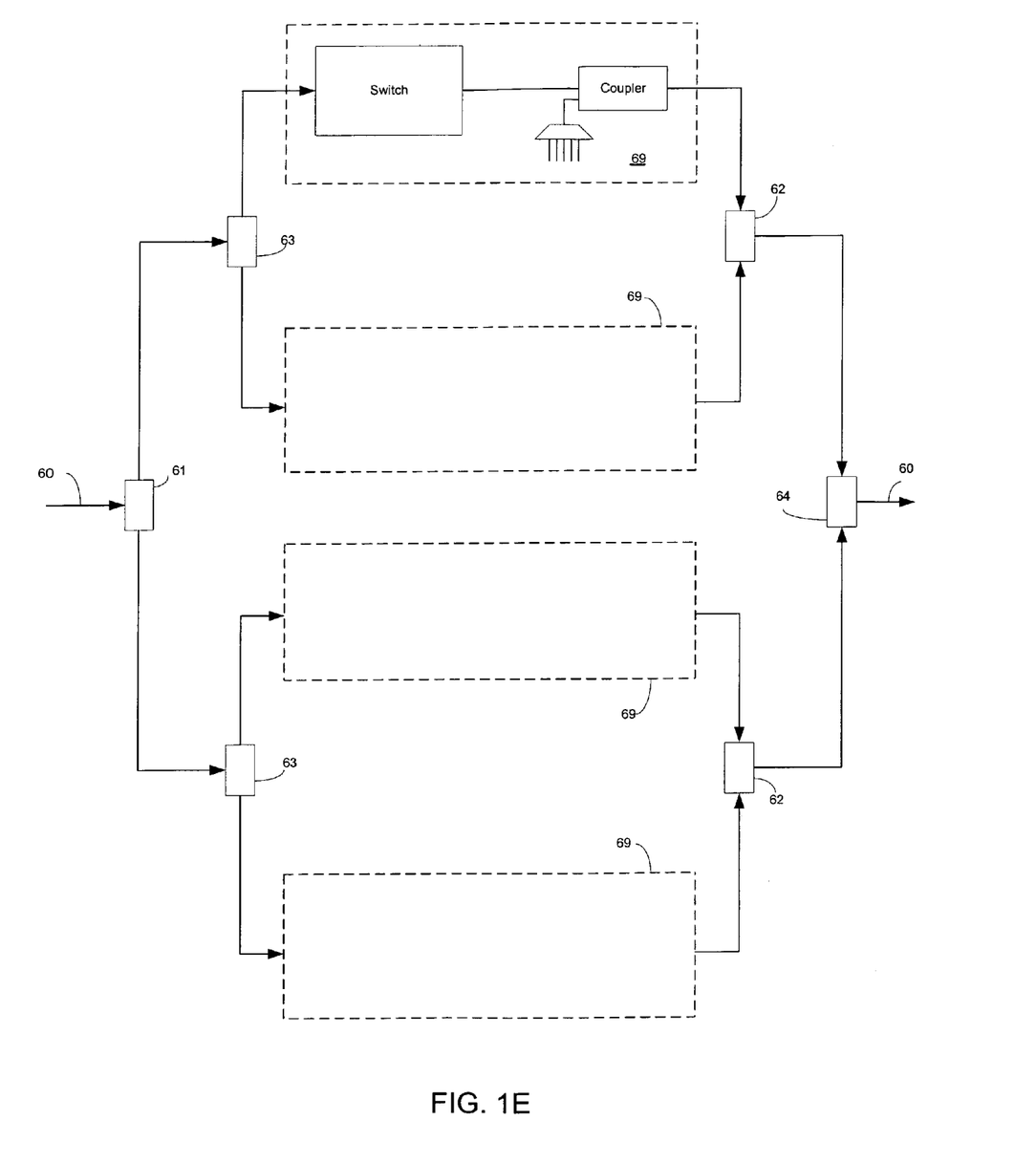
FIG. 1E illustrates an expanded add/drop multiplexer architecture in which the FIG. 1C add/drop multiplexer architecture is modularized.

FIG. 1E illustrates another advantage of the FIG. 1C architecture, i.e., the easy upward scalability of the add/drop multiplexer into a larger system. In this scaled architecture several FIG. 1C add/drop multiplexers form modules 69 of the larger system. The incoming WDM signals on an optical fiber 60 are separated by demultiplexer elements 61 and 63 into signal bands of different WDM channels. For purposes of illustration, the demultiplexer element 61 connected to the optical fiber 60 is shown as separating the received WDM signals in two sets of output signals, one set has bands I and II, and the other set bands III and IV. The demultiplexer elements 63 separate the first set of output signals into bands I and II, and the second set of output signals into bands III and IV. Each of the bands is input to one of the modules 69. Each module 69 can drop and add WDM signals in each of the bands, as described above with respect to FIG. 1C. Output signals from the modules 69 are combined by multiplexer elements 62 and 64. The multiplexer elements 62 combine the band I and II WDM signals from the top two modules 69 into a first output set of signals and the band III and IV WDM signals from the bottom two modules 69 into a second output set. The multiplexer element 64 combines the two output sets for the optical fiber 60.

With the addition of the demultiplexer and multiplexer elements, the modular architecture of FIG. 1E has a drop insertion loss of 7 dB, and add insertion loss of 7 dB, and a through insertion loss of 14.5 dB. With the straightforward design, good optical performance, and scalability into larger systems, the architecture of FIG. 1C would seem ideal.

Figure 2:
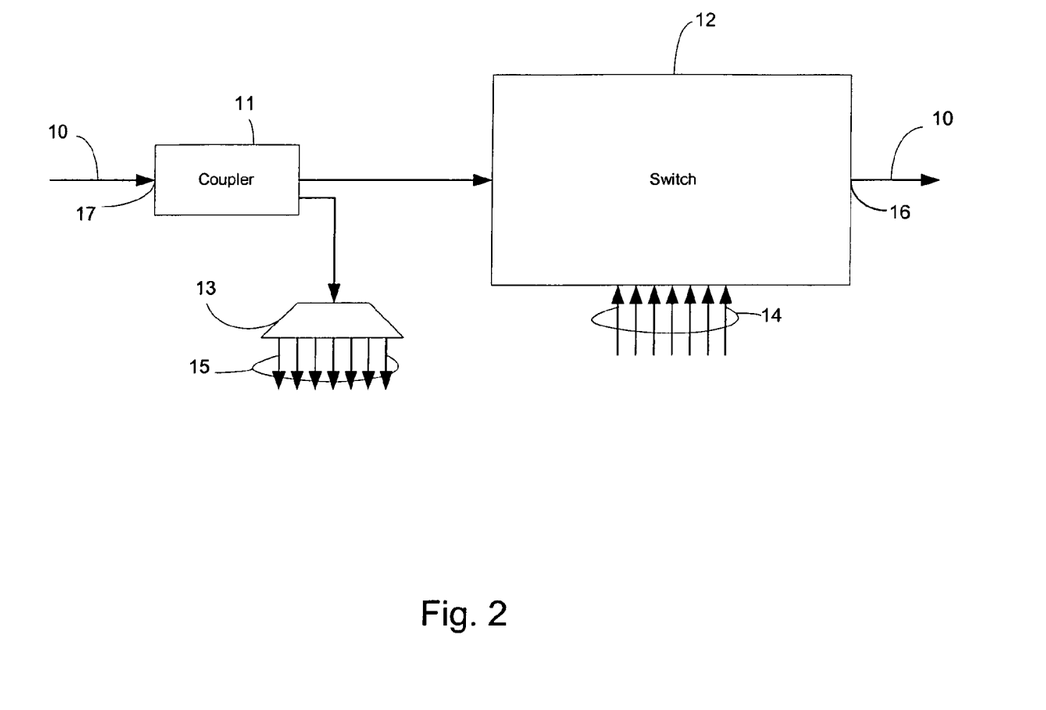
FIG. 2 illustrates the reconfigurable optical add/drop multiplexer with add wavelength selective switch according to one embodiment of the present invention.

Nonetheless, the present invention eschews the FIG. 1C add/drop multiplexer design. Rather than combining the drop and blocking functions, the present invention combines the add and blocking functions in a wavelength-selective switch. FIG. 2 illustrates the general organization of such a reconfigurable optical add/drop multiplexer, according to one embodiment of the present invention. Connected to an optical fiber 10 which carries the WDM signals, the reconfigurable optical add/drop multiplexer has a coupler 11 and a demultiplexer element 13 for the drop function. The coupler 11, which has its input terminal 17 connected to the optical fiber 10, splits off a portion of the WDM signals carried on the optical fiber 10. While the power of the WDM signals can be split evenly, in one embodiment of the present invention a minority portion of the power is directed toward the demultiplexer element 13; most of the power is directed through the coupler 11 to a wavelength-selective switch 12. For example, an coupler, may direct 70-90% of the optical power of the WDM signals through the coupler 11 and the balance of the power diverted to the demultiplexer element 13. In turn, the demultiplexer element 13, such as a Gaussian AWG, separates the split-off signals into constituent WDM channels at drop terminals 15. Companies, such as JDSU Uniphase Corporation of San Jose, Calif. and Avanex Corporation of Fremont, Calif., are sources for couplers and Gaussian AWGs.

Figure 3A:
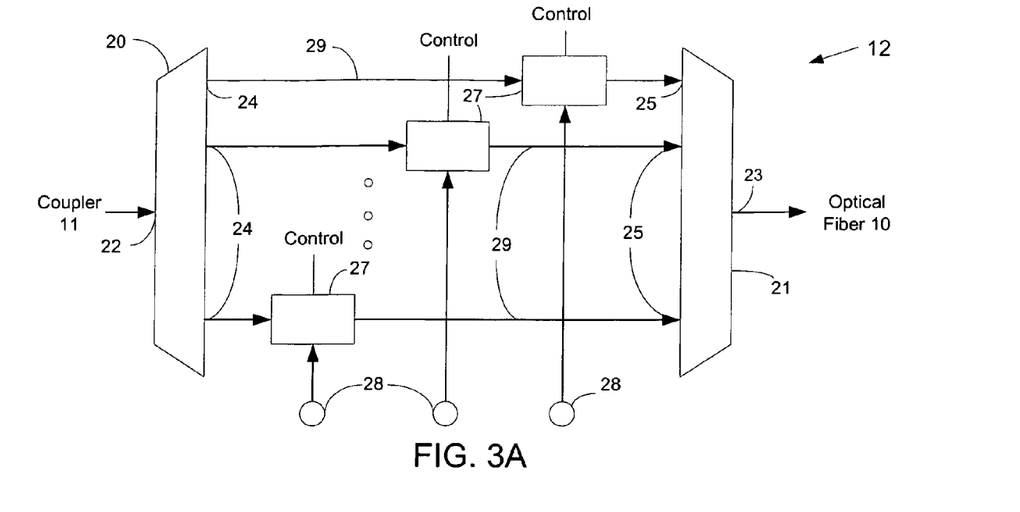
FIG. 3A illustrates the organization of one embodiment of a wavelength-selective switch of the FIG. 2 add/drop multiplexer according to the present invention.

The wavelength-selective switch 12, which has its output terminal 16 connected to the optical fiber 10, receives the passed signals from the coupler 11 for the add (and blocking) function. Optical switching may be implemented in MEMS (MicroElectroMechanicalSystems) technology or PLC (Planar Lightguide Circuit) technology. PLC has the greatest potential of integration, i.e., the incorporation of the elements of the wavelength-selective switch into a single monolithic device. As in the case of electronic systems, integration of optical elements results in physically smaller systems with reduced numbers of separate parts, increased reliability, and higher operating speeds FIG. 3A illustrates the organization of the wavelength-selective switch 12 which is suitable for integration on a single PLC substrate. The switch 12 has a demultiplexer element 20, a multiplexer element 21 and a plurality of 2×1 switches 27. An input terminal 22 of the demultiplexer element 20 receives the WDM signals from the coupler 11 which are separated on output terminals 24 and connected signal paths 29. While only three paths 29 are shown, it is understood that there are preferably 32 paths for each WDM channel into which the demultiplexer element 20 separates the WDM signals. Signals in each WDM channel can then be controlled by the switch 12. Of course, other number of paths can be used with the appropriate changes in switch operation.

Figure 3B:
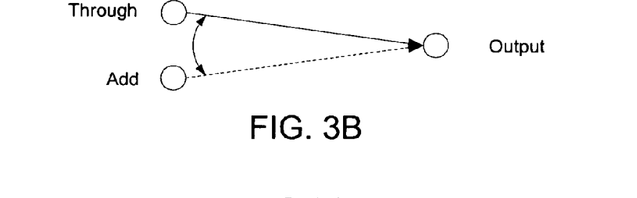
FIG. 3B represents the operation of a 2×1 optical switch in the wavelength-selective switch of FIG. 3A.

Each of the signal paths 29 are connected to one of the input terminals 25 of the multiplexer element 21 through a 2×1 switch 27. Each switch 27 has an output terminal connected to its respective input terminal 25 of the multiplexer 21 and two input terminals, the first connected to its respective output terminal 24 of the demultiplexer 20 and the second input terminal to an add terminal 28, which in turn is connected to a WDM signal source. Responsive to a signal on a control line, each switch 27 operates in two modes to either pass signals from the demultiplexer output terminal 24 to the multiplexer input terminal 25 or to add signals from its add terminal 28 to the multiplexer input terminal 25. FIG. 3B represents the basic operation of each 2×1 switch 27. Signals from either the connected coupler 11 via the Through input terminal or from an add terminal 28 via the Add input terminal are sent to the multiplexer 21 via the Output terminal. The direction of the WDM signals in the representational switch is shown by the straight arrows and the operation of the switch by the two-headed arrow. It should be noted that when the switch 27 selects one input terminal, signals from the other input terminal are blocked. For example, if the switch 27 is set to the Add input terminal, WDM signals from the coupler 11 are effectively blocked from the Output terminal. Hence the wavelength-selective switch 12 desirably combines the blocking function along with the add function.

Figure 3C:
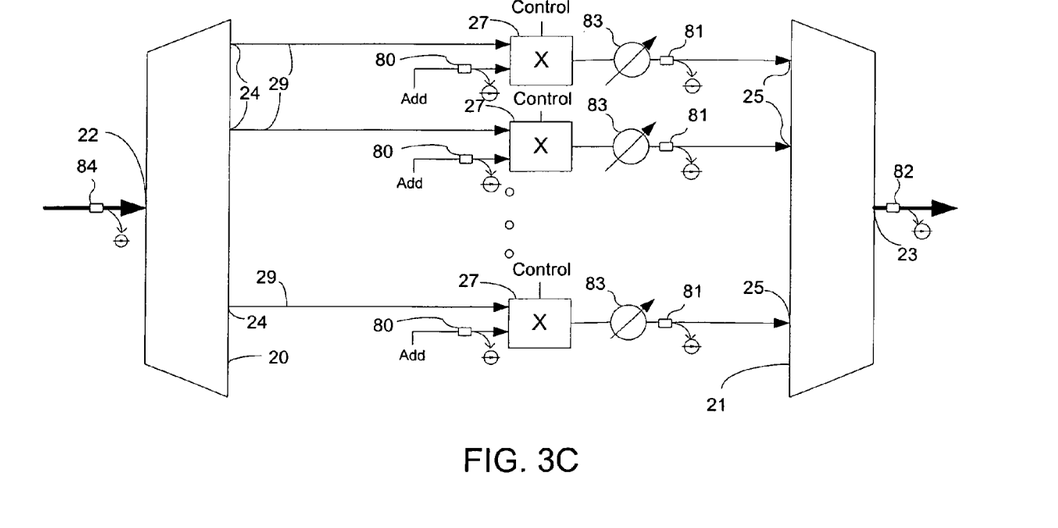
FIG. 3C shows the FIG. 3A wavelength-selective switch in greater detail.

FIG. 3C illustrates the wavelength-selective switch 12 in greater detail. Optical power is monitored before and after each 2×1 switch 27 through monitoring nodes 80 and 81 respectively, which are each connected to photodiodes (shown symbolically). The photodiodes generate electrical signals indicative of the optical power of the optical signals at the monitoring nodes. The monitoring node 80 is at the add input terminal of the switch 27 and the monitoring node 81 is on the output terminal of the switch 27 after a VOA (Variable Optical Attenuator) 83 which controls the power of the signal leaving the switch 27. Control lines and signals to the VOAs 83 are not shown in the drawings. The total output power from the multiplexer 21 is observed through a monitoring node 82 at the output terminal 23 of the multiplexer 21 and total input power to the demultiplexer 20 is monitored through a monitoring node 84 at the input terminal 22 of the demultiplexer 20. Hence power on the paths of the wavelength-selective switch 12 and through the constituent switches 27 is monitored through the monitoring nodes and independently controlled by the VOAs 83.

The resulting add/drop multiplexer of the present invention has many advantages. First, performance of the described add/drop multiplexer is excellent. Estimated through insertion loss is about 10.5 dB so that less overall amplification is required for the optical fiber 10 and its interconnected network system. Add insertion loss is about 6 dB which lowers requirements for WDM signal sources on the add terminals for easy "plugability." While drop insertion loss is about 12 dB, higher than those of the FIG. 1C add/drop multiplexer, the add/drop multiplexer of the present invention allows for an unlimited drop-and-continue operation. That is, an incoming WDM signal can be dropped by the coupler 11 and the same signal continued by the wavelength-selective switch 12 onto the optical fiber 10, as long as no signals of that dropped WDM channel are added. This operation of drop and continue permits easy video-on-demand (VoD) by which video, i.e., television, signals can be broadcast over optical fiber cable. In contrast, the add/drop architecture of FIG. 1C requires additional measures for drop-and-continue operations to circumscribe the drop and blocking functions of the FIG. 1C wavelength-selective switch. Such measures increase complexity and costs.

Additionally, since the demultiplexer 13 can be selected or adjusted to place any or all WDM channel signals on the drop terminals 15, monitoring of any WDM channel, such as its Bit Error Rate (BER), is simple. Another advantageous feature is that simple binary control over the switching function by the 2×1 switches 27. Finally, the add/drop multiplexer of present invention has the advantages of upward scalability as discussed with the FIG. 1C add/drop multiplexer.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. A reconfigurable WDM add/drop multiplexer operative as an add/drop node on an optical fiber carrying a plurality of WDM signals, said add/drop multiplexer comprising:
   a coupler splitting said WDM signals on said optical fiber, said coupler having an input terminal for connection to said optical fiber, and first and second output terminals for said split WDM signals from said optical fiber;
   a demultiplexer element connected to said first coupler output terminal, said demultiplexer separating said split WDM signals at a plurality of drop terminals; and
   a wavelength-selective switch having a demultiplexer element having a plurality of output terminals and an input terminal for connection to said second coupler output terminal a multiplexer having a plurality of input terminals and an output terminal for connection to said optical fiber, and a plurality of 2×1 switches, each connected to one of said demultiplexer output terminals, one of said multiplexer input terminals and one of a plurality of add terminals, each switch either connecting said multiplexer input terminal to said demultiplexer output terminal or to said add terminal in response to a control signal, whereby said wavelength-selective switch selectively adds WDM signals on said plurality of add terminals responsive to control signals.

2. The reconfigurable WDM add/drop multiplexer of claim 1 wherein said coupler splits power of said WDM signals evenly to said first and second coupler output terminals.

3. The reconfigurable WDM add/drop multiplexer of claim 1 wherein said coupler splits power of said WDM signals unevenly to said first and second coupler output terminals.

4. The reconfigurable WDM add/drop multiplexer of claim 3 wherein said coupler splits no less than 80 percent of said WDM signal power to said second coupler output terminal.

5. The reconfigurable WDM add/drop multiplexer of claim 1 further comprising a first monitoring point at said wavelength-selective switch demultiplexer input terminal, a second monitoring point at said wavelength-selective switch multiplexer output terminal, a plurality of third monitoring points, each third monitoring point between each 2×1 switch and its connected wavelength-selective switch multiplexer input terminal, and a plurality of fourth monitoring points, each fourth monitoring point between each 2×1 switch and its connected add terminal.

6. The reconfigurable WDM add/drop multiplexer of claim 5 wherein said plurality of monitoring points include a fifth monitoring point at said first coupler output terminal, and a sixth monitoring point at said second coupler output terminal.

7. The reconfigurable WDM add/drop multiplexer of claim 1 wherein each 2×1 switch is implemented in a technology selected from the group comprising MEMS (MicroElectro-Mechanical System) and (PLC) Programmable Logic Controller devices.

8. The reconfigurable WDM add/drop multiplexer of claim 1 further comprising a plurality of variable optical attenuators, each variable optical attenuator connected between one of said plurality of 2×1 switches and its connected multiplexer input terminal.

9. A method of operating an add/drop node on a optical fiber carrying a plurality of WDM signals, said method comprising
   splitting said WDM signals on said optical fiber into first and second paths;
   separating said WDM signals on said first path at a plurality of drop terminals;
   separating said WDM signals on said second path into a plurality of wavelength paths;
   selectively adding WDM signals on a plurality of add terminals into at least some of said wavelength paths and by selectively adding said WDM signals, blocking said separated signals on said at least some of said wavelength paths, responsive to control signals, including adding WDM signals on one add terminal into said one wavelength path and blocking said separated signals on said one wavelength path for each one of said at least some of said wavelength paths; and
   combining said added WDM signals on said at least some of said wavelength paths and nonblocked separated signals on a balance of said wavelength paths into said optical fiber.

10. The method of claim 9 herein said splitting step comprises splitting WDM signal power evenly between said first and second paths.

11. The method of claim 9 wherein said splitting step comprises splitting WDM signal power unevenly between said first and second paths.

12. The method of claim 11 wherein no less than 80 percent of said WDM signal power is sent to said second path.

13. The method of claim 9 further comprising a monitoring step including:
   monitoring WDM signal power on said second path before said WDM signals are separated;
   monitoring WDM signal power on said optical fiber after said added WDM signals and said nonblocked separated signals are combined;
   monitoring WDM signal power on each of said wavelength paths before said added WDM signals and said nonblocked separated signals are combined; and
   monitoring WDM signal power on each of said add terminals.

14. The method of claim 13 wherein said monitoring step further includes:
   monitoring WDM signal power on said first path before said WDM signals are split; and
   monitoring WDM signal power on said second path before said WDM signals are split.

15. The method of claim 13 further comprising in response to said monitoring step, controlling said WDM signal power on each of said wavelength paths before said added WDM signals on said at least some of said wavelength paths and nonblocked separated signals on a balance of said wavelength paths are combined into said optical fiber.

16. A reconfigurable WDM add/drop multiplexer operative as an add/drop node on an optical fiber carrying a plurality of WDM signals, said add/drop multiplexer comprising:
   means for splitting said WDM signals on said optical fiber into first and second paths;

means for separating said WDM signals on said first path at a plurality of drop terminals;

means for separating said WDM signals on said second path into a plurality of wavelength paths;

means for selectively adding WDM signals on a plurality of add terminals into at least some of said wavelength paths and by selectively adding said WDM signals, blocking said separated signals on said at least some of said wavelength paths, responsive to control signals, including means for adding WDM signals on one add terminal into said one wavelength path and blocking said separated signals on said one wavelength path for each one of said at least some of said wavelength paths; and means for combining said added WDM signals on said at least some of said wavelength paths and nonblocked separated signals on a balance of said wavelength paths into said optical fiber.

17. The method of claim 16 wherein said means for splitting comprises means for splitting WDM signal power evenly between said first and second paths.

18. The method of claim 16 wherein said means for splitting comprises means for splitting WDM signal power unevenly between said first and second paths.

19. The method of claim 18 wherein no less than 80 percent of said WDM signal power is sent to said second path.

20. The method of claim 16 further comprising means for monitoring including:
means for monitoring WDM signal power on said second path before said WDM signals are separated;
means for monitoring WDM signal power on said optical fiber after said added WDM signals and said nonblocked separated signals are combined;
means for monitoring WDM signal power on each of said wavelength paths before said added WDM signals and said nonblocked separated signals are combined; and
means for monitoring WDM signal power on each of said add terminals.

21. The method of claim 20 wherein said means for monitoring further includes:
means for monitoring WDM signal power on said first path before said WDM signals are split; and
means for monitoring WDM signal power on said second path before said WDM signals are split.

22. The method of claim 20 further comprising in response to said means for monitoring step, means for controlling said WDM signal power on each of said wavelength paths before said added WDM signals on said at least some of said wavelength paths and nonblocked separated signals on a balance of said wavelength paths are combined into said optical fiber.

23. A reconfigurable WDM add/drop multiplexer operative as an add/drop node on an optical fiber carrying a plurality of WDM signals, said add/drop multiplexer comprising:
a coupler splitting said WDM signals on said optical fiber, said coupler having an input terminal for connection to said optical fiber, and first and second output terminals for said split WDM signals from said optical fiber;
a demultiplexer element connected to said first coupler output terminal, said demultiplexer separating said split WDM signals at a plurality of drop terminals; and
a wavelength-selective switch having an input terminal for connection to said second coupler output terminal, an output terminal for connection to said optical fiber, said wavelength-selective switch selectively adding WDM signals on a plurality of add terminals responsive to control signals, said wavelength-selective switch automatically blocking all WDM signals from said coupler corresponding to WDM signals selectively added through said plurality of add terminals.

24. The reconfigurable WDM add/drop multiplexer of claim 23 wherein said wavelength-selective switch comprises
a demultiplexer element having a plurality of output terminals and an input terminal comprising said wavelength-selective switch input terminal;
a multiplexer having a plurality of input terminals and an output terminal comprising said wavelength-selective switch output terminal; and
a plurality of 2×1 switches, each connected to one of said demultiplexer output terminals, one of said multiplexer input terminals and one of said add terminals, each switch either connecting said multiplexer input terminal to said demultiplexer output terminal or to said add terminal in response to one of said control signals.

25. A method of operating an add/drop node on a optical fiber carrying a plurality of WDM signals, said method comprising
splitting said WDM signals on said optical fiber into first and second paths;
separating said WDM signals on said first path at a plurality of drop terminals only;
separating said WDM signals on said second path into a plurality of wavelength paths;
selectively adding WDM signals on a plurality of add terminals into at least some of said wavelength paths and by selectively adding said WDM signals, blocking said separated signals on said at least some of said wavelength paths, responsive to control signals; and
combining said added WDM signals on said at least some of said wavelength paths and nonblocked separated signals on a balance of said wavelength paths into said optical fiber.

26. The method of claim 25 wherein said selectively adding and blocking step comprises:
for each one of said at least some of said wavelength paths, adding WDM signals on one add terminal into said one wavelength path and blocking said selected signals on said one wavelength path.

27. A reconfigurable WDM add/drop multiplexer operative as an add/drop node on an optical fiber carrying a plurality of WDM signals, said add/drop multiplexer comprising:
means for splitting said WDM signals on said optical fiber into first and second paths;
means for separating said WDM signals on said first path at a plurality of drop terminals only;
means for separating said WDM signals on said second path into a plurality of wavelength paths;
means for selectively adding WDM signals on a plurality of add terminals into at least some of said wavelength paths and by selectively adding said WDM signals, blocking said separated signals on said at least some of said wavelength paths, responsive to control signals; and
means for combining said added WDM signals on said at least some of said wavelength paths and nonblocked separated signals on a balance of said wavelength paths into said optical fiber.

28. The method of claim 27 wherein said means for selectively adding and blocking comprises:
for each one of said at least some of said wavelength paths, means for adding WDM signals on one add terminal into said one wavelength path and blocking said selected signals on said one wavelength path.

* * * * *

UNITED STATES PATENT AND TRADEMARK OFFICE
CERTIFICATE OF CORRECTION

PATENT NO. : 7,634,196 B2  Page 1 of 1
APPLICATION NO. : 10/959366
DATED : December 15, 2009
INVENTOR(S) : Gerstel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1388 days.

Signed and Sealed this

Twenty-first Day of December, 2010

David J. Kappos
*Director of the United States Patent and Trademark Office*